US009928372B2

(12) United States Patent
Chang

(10) Patent No.: US 9,928,372 B2
(45) Date of Patent: Mar. 27, 2018

(54) SELECTIVE SCREEN PRIVACY

(71) Applicant: PAYPAL, INC., San Jose, CA (US)

(72) Inventor: Suzy K. Chang, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 49 days.

(21) Appl. No.: 14/921,940

(22) Filed: Oct. 23, 2015

(65) Prior Publication Data

US 2017/0116425 A1    Apr. 27, 2017

(51) Int. Cl.
| | | |
|---|---|---|
| G06F 21/00 | (2013.01) | |
| G06F 21/62 | (2013.01) | |
| G06K 9/00 | (2006.01) | |
| G02B 5/20 | (2006.01) | |
| G02B 27/28 | (2006.01) | |
| G02B 5/30 | (2006.01) | |
| G09G 3/36 | (2006.01) | |

(52) U.S. Cl.
CPC .............. *G06F 21/62* (2013.01); *G02B 5/201* (2013.01); *G02B 5/3016* (2013.01); *G02B 27/288* (2013.01); *G06K 9/00228* (2013.01); *G09G 3/3611* (2013.01); *G09G 2320/068* (2013.01); *G09G 2358/00* (2013.01)

(58) Field of Classification Search
CPC ....... G06F 21/62; G02B 5/3016; G02B 5/201; G02B 27/288; G09G 5/38; G09G 2320/068; G09G 3/3611; G09G 2358/00; G06K 9/00228
See application file for complete search history.

(56) References Cited

U.S. PATENT DOCUMENTS

| | | | | |
|---|---|---|---|---|
| 5,936,596 A | * | 8/1999 | Yoshida ................ | G02F 1/1323 345/87 |
| 6,243,060 B1 | * | 6/2001 | Natori ..................... | G09F 9/302 345/589 |
| 6,288,741 B1 | * | 9/2001 | Alejo Trevijano .. | G02B 27/225 345/87 |
| 6,633,306 B1 | * | 10/2003 | Marz ..................... | G02F 1/1323 345/3.3 |
| 6,765,550 B2 | * | 7/2004 | Janick ...................... | G02B 5/00 345/87 |
| 7,134,130 B1 | | 11/2006 | Thomas | |
| 8,922,480 B1 | * | 12/2014 | Freed ....................... | G09G 5/00 345/156 |
| 9,069,519 B1 | * | 6/2015 | Hall ...................... | G06F 3/1446 |
| 9,318,041 B2 | * | 4/2016 | Kawabata ............ | G09G 3/2018 |
| 9,355,612 B1 | | 5/2016 | Shepard et al. | |

(Continued)

OTHER PUBLICATIONS

Yamada T., Gohshi S., Echizen I. (2013) Enhancement of Method for Preventing Unauthorized Copying of Displayed Information Using Object Surface Reflection. The International Workshop on Digital Forensics and Watermarking 2012. Lecture Notes in Computer Science, vol. 7809. Springer, Berlin, Heidelberg.*

(Continued)

*Primary Examiner* — David García Cervetti
(74) *Attorney, Agent, or Firm* — Haynes & Boone LLP

(57) ABSTRACT

A system and method adjusts the viewing angle of a display based on user input and/or automatically based on content and/or detected viewers. The viewing angle changes may be limited to certain portions of the display or the whole display. The system and method may change viewing angles in different direction separately and independently.

19 Claims, 5 Drawing Sheets

(56) References Cited

U.S. PATENT DOCUMENTS

| | | | |
|---|---|---|---|
| 9,552,752 B1* | 1/2017 | Perut | G09F 13/22 |
| 2001/0028430 A1* | 10/2001 | Koma | G02F 1/1393 |
| | | | 349/139 |
| 2002/0033923 A1* | 3/2002 | Shimoshikiryou | G02F 1/1393 |
| | | | 349/141 |
| 2002/0149598 A1* | 10/2002 | Greier | G09G 3/3611 |
| | | | 345/589 |
| 2002/0158967 A1* | 10/2002 | Janick | G02B 5/00 |
| | | | 348/87 |
| 2003/0038924 A1* | 2/2003 | Veligdan | H04N 5/7416 |
| | | | 353/38 |
| 2003/0043313 A1* | 3/2003 | Minoura | G02F 1/133362 |
| | | | 349/62 |
| 2005/0099573 A1* | 5/2005 | Kubo | G02F 1/134309 |
| | | | 349/146 |
| 2005/0235217 A1 | 10/2005 | Hoe-Richardson | |
| 2006/0056626 A1 | 3/2006 | Keohane et al. | |
| 2006/0126156 A1* | 6/2006 | Evans | G02F 1/1323 |
| | | | 359/320 |
| 2006/0197739 A1* | 9/2006 | Kastalsky | G02B 26/026 |
| | | | 345/109 |
| 2006/0238664 A1* | 10/2006 | Uehara | G02B 6/0036 |
| | | | 349/1 |
| 2007/0040780 A1* | 2/2007 | Gass | G02F 1/134363 |
| | | | 345/87 |
| 2007/0040975 A1* | 2/2007 | Momoi | G02F 1/1323 |
| | | | 349/129 |
| 2007/0222915 A1* | 9/2007 | Niioka | G02F 1/133509 |
| | | | 349/62 |
| 2008/0107274 A1 | 5/2008 | Worthy | |
| 2008/0143755 A1* | 6/2008 | Sung | G09G 3/3611 |
| | | | 345/690 |
| 2008/0284843 A1* | 11/2008 | Jo | H04N 13/0018 |
| | | | 348/51 |
| 2009/0096710 A1* | 4/2009 | Raman | G09G 3/2011 |
| | | | 345/1.1 |
| 2009/0115943 A1* | 5/2009 | Gaides | B29D 11/0073 |
| | | | 349/96 |
| 2009/0242142 A1* | 10/2009 | Bellwood | G06F 21/84 |
| | | | 160/127 |
| 2010/0085517 A1* | 4/2010 | Hong | G02B 27/22 |
| | | | 349/106 |
| 2010/0124363 A1* | 5/2010 | Ek | G06F 21/32 |
| | | | 382/118 |
| 2010/0149459 A1* | 6/2010 | Yabuta | G02F 1/133528 |
| | | | 349/74 |
| 2010/0220043 A1* | 9/2010 | Broughton | G02F 1/1323 |
| | | | 345/87 |
| 2011/0001712 A1* | 1/2011 | Saito | G02F 1/13338 |
| | | | 345/173 |
| 2011/0018860 A1* | 1/2011 | Parry-Jones | G09G 3/20 |
| | | | 345/214 |
| 2011/0058115 A1* | 3/2011 | Matsushima | G02F 1/1323 |
| | | | 349/42 |
| 2011/0058240 A1* | 3/2011 | Dell'Eva | G02B 5/32 |
| | | | 359/23 |
| 2011/0173438 A1 | 7/2011 | Matzkel | |
| 2011/0203745 A1* | 8/2011 | Abreu | E06B 7/082 |
| | | | 160/178.1 R |
| 2012/0013610 A1* | 1/2012 | Chae | G02B 27/22 |
| | | | 345/419 |
| 2012/0050342 A1* | 3/2012 | Huang | G02F 1/1323 |
| | | | 345/690 |
| 2012/0050651 A1* | 3/2012 | Huang | G02F 1/133615 |
| | | | 349/95 |
| 2012/0168070 A1* | 7/2012 | Nelson | G02B 17/006 |
| | | | 156/280 |
| 2012/0300046 A1 | 11/2012 | Blayvas | |
| 2013/0076673 A1 | 3/2013 | Sirpal et al. | |
| 2013/0083999 A1 | 4/2013 | Bhardwaj et al. | |
| 2013/0300648 A1 | 11/2013 | Kim et al. | |
| 2014/0029810 A1* | 1/2014 | Barr | G06K 9/00295 |
| | | | 382/118 |
| 2014/0108791 A1 | 4/2014 | Sinclair et al. | |
| 2014/0118423 A1* | 5/2014 | Hasegawa | G09G 3/2003 |
| | | | 345/690 |
| 2014/0146069 A1* | 5/2014 | Tan | G06F 3/011 |
| | | | 345/589 |
| 2014/0201844 A1 | 7/2014 | Buck | |
| 2014/0254927 A1 | 9/2014 | Bhardwaj et al. | |
| 2014/0337175 A1 | 11/2014 | Katzin et al. | |
| 2015/0009563 A1* | 1/2015 | Lauters | G02B 5/003 |
| | | | 359/485.03 |
| 2015/0058941 A1 | 2/2015 | Lyman et al. | |
| 2015/0070386 A1 | 3/2015 | Farens et al. | |
| 2015/0085251 A1 | 3/2015 | Larsen | |
| 2015/0109674 A1* | 4/2015 | Cok | G02B 5/003 |
| | | | 359/613 |
| 2015/0235609 A1* | 8/2015 | Hall | G09G 5/003 |
| | | | 345/520 |
| 2015/0249673 A1 | 9/2015 | Niemoeller et al. | |
| 2016/0071448 A1* | 3/2016 | Schwarz | G09G 3/20 |
| | | | 349/83 |
| 2016/0098692 A1* | 4/2016 | Johnson | G06Q 40/12 |
| | | | 705/43 |
| 2016/0098700 A1* | 4/2016 | Johnson | G06Q 20/1085 |
| | | | 705/43 |
| 2016/0098709 A1* | 4/2016 | Johnson | G07F 19/20 |
| | | | 705/43 |
| 2016/0210473 A1* | 7/2016 | Cohen | H04W 52/0254 |
| 2016/0300081 A1* | 10/2016 | Weksler | G06F 21/84 |
| 2016/0345001 A1* | 11/2016 | Baek | H04N 13/0447 |
| 2016/0351539 A1* | 12/2016 | Bower | H01L 25/0655 |
| 2017/0031434 A1* | 2/2017 | Files | G06F 3/013 |
| 2017/0082894 A1* | 3/2017 | Katsuta | G02F 1/1337 |

OTHER PUBLICATIONS

T. Yamada, S. Gohshi and I. Echizen, "Preventing unauthorized copying of displayed information by utilizing differences in spectral sensitivity between humans and imaging devices," 2012 IEEE International Workshop on Information Forensics and Security (WIFS), Tenerife, 2012, pp. 145-150.*

Z. Gao, G. Zhai, J. Zhou, X. Min and C. Hu, "Information security display via uncrowded window," 2014 IEEE Visual Communications and Image Processing Conference, Valletta, 2014, pp. 454-457.*

International Searching Authority, Search Report and Written Opinion of the International Searching Authority for PCT/US2015/063453, dated Feb. 25, 2016, 6 pages.

Eyetracking, Inc., "About Us: What is Eyetracking?"; Solana Beach, CA 92075, USA, www.eyetracking.com, 2011, 2 pages.

Fujitsu Laboratories Ltd., Kawasaki, Japan, "Fujitsu Develops Eye Tracking Technology," Oct. 2, 2012, 4 pages.

Huang, Weidong, Handbook of Human Centric Visualization, "Visual Analysis of Eye Tracking Data" Springer Link, http://link.springer.com, Springer International Publishing AG, Jun. 25, 2013, 5 pages.

* cited by examiner

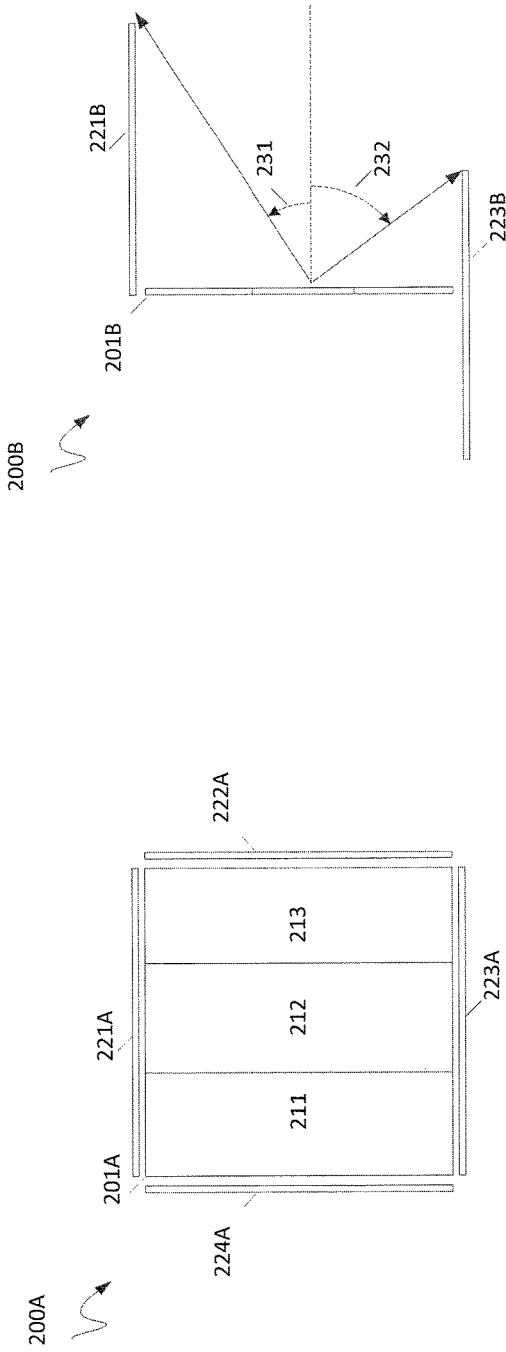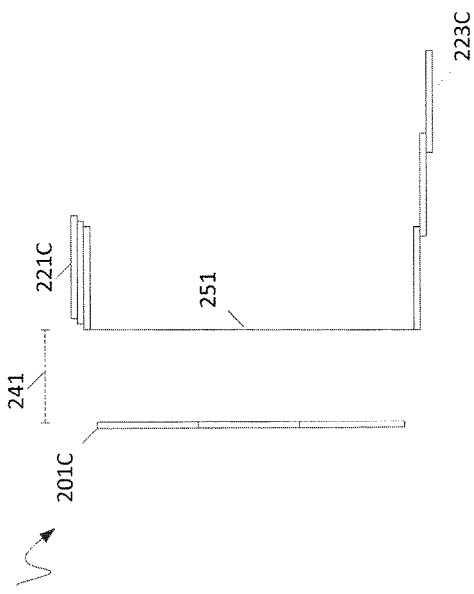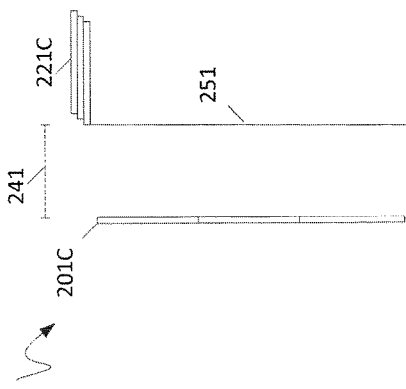

SELECTIVE SCREEN PRIVACY

BACKGROUND

Field of the Invention

The present disclosure generally relates to systems and methods for screen privacy and more particularly to selectively obscuring content being displayed from certain viewing angles.

Related Art

As society has become more dependent on computer devices to perform everyday tasks, a desire for screen privacy has developed. People want to view information on their computer devices in public areas without the worry of someone else being able to also view the information. One solution that was developed for this problem is a film that, when placed over a screen, limits the viewing angle for the screen. The film prevents light emitted from the screen to be viewed passed a certain angle. However, the film is not adjustable in any manner. These films do not allow a user to choose what parts of the covered screen can be viewed from certain viewing angles and when the covered screen can be viewed past certain viewing angles. Additionally, the film is set to a fixed viewing angle that is not adjustable. Furthermore, the film is only capable of shortening the viewing angle at preset directions. Another drawback is that the films are not perfectly transparent. As a result, the display is dimmed because some of the light from the screen is absorbed by the film.

It would be beneficial for a system and method that implements screen privacy that allows for selectively changing the viewing angle for certain areas of a display in certain directions and/or capable of independently adjusting the viewing angle for multiple viewing directions (e.g. up, down, left, and right). For example, it would be beneficial to have a display that can be adjusted to widen or shorten the viewing angle such that several individuals in close proximity are able to view the contents being displayed while preventing individuals at more obtuse angles from viewing the contents. It would also be beneficial for a system that would allow for shortening or widening the viewing angle for one or more directions, e.g. allowing someone directly above or left of the screen to view contents of the display but not someone to the right side or below. In this manner, the display device would effectively direct images in a certain direction for viewing. It would also be desirable if the above desired features could be implemented as remotely and/or automatically controlled. It would also be advantageous if these features could be achieved without dimming the display to viewers.

BRIEF DESCRIPTION OF THE FIGURES

FIG. 2A-C illustrates exemplary pixels and micro-louvers that may be implemented in an exemplary display capable of implementing selective screen privacy.

Figure 1:
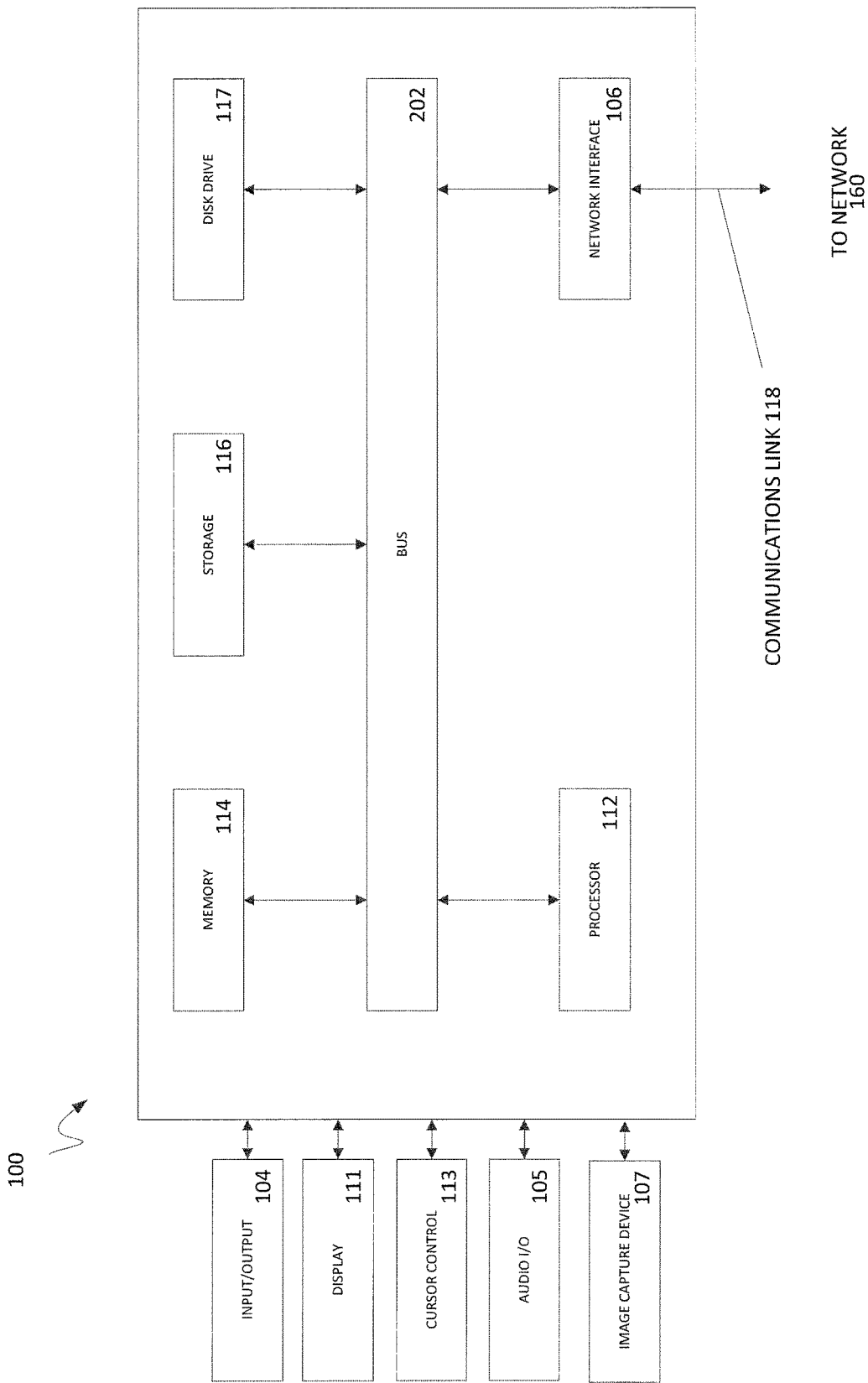
FIG. 1 is a block diagram of an exemplary computing system that is adapted for implementing selective screen privacy.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

In some embodiments, systems and/or methods for dynamically adjusting the viewing angle of a display for screen privacy are disclosed. In some embodiments, an exemplary display capable of adjusting the viewing angles in one or more directions is disclosed. In some examples, the viewing angle of a display is controlled by adjustable micro-louvers.

In some embodiments, micro-louvers that may be extendable, retractable, and/or telescoping are placed adjacent to pixels of a display. In some embodiments, the viewing angle of a pixel is dynamically adjusted based on the position of the micro-louver. For example, the side to side viewing angle of the pixel may be reduced by extending one or more of the micro-louvers placed on the sides of the pixel. In contrast, the side to side viewing angle of the pixel may be increased by retracting the micro-louvers placed on the sides of the pixel. Viewing angles for other directions may be controlled based on the number of micro-louvers, the placements of the micro-louvers, and/or the shape of the pixel. In some examples a display implements a plurality of pixels with adjustable micro-louvers such that the pixels may, in concert, display intricate images with each pixel displaying a piece of the image. The micro-louvers may adjust the viewing angle of the displayed image based on the extension state of the micro-louvers. The resolution of such a display may depend, at least in part, on the number of pixels implemented by the display.

In some examples, the display may adjust one or more micro-louvers such that the display has different viewing angles depending on the viewing direction. For example, there may be micro-louvers positioned on the diagonal edges of the pixels to affect the viewing angles in the diagonal directions. Similarly, there may be micro-louvers that are positioned above and below the pixel that affects the up and down viewing angles. The number of sides with adjustable viewing angles may depend on the number of adjustable micro-louvers. Additionally, the viewing angle of the display may be different depending on the direction a viewer is viewing the display. For example, the system may be capable of setting the viewing angle from side to side to be a first viewing angle, such as 40 degrees, the up and down viewing angle to be visible at a second viewing angle, such as 60 degrees, one of the diagonal viewing angles to be visible at a third viewing angle, such as 70 degrees, and another of the diagonal viewing angles to be a fourth viewing angle, such as 80 degrees. One exemplary implementation of such a system may be a hexagonal pixel with a micro-louver on each side of the hexagon.

In some embodiments a system allows for a user to manually adjust the viewing angle of a display in one or more directions. In some embodiments, the viewing angles may be predetermined options that the user may select from. In some embodiments, the viewing angles may be set within a range. That range may depend on the distance that one or more micro-louvers can be extended and/or retracted. In some embodiments, the system may determine, based on a user provided and/or selected viewing angle, the extension state of one or more micro-louvers to achieve the requested viewing angle. In some examples, a user may also be able to select the portions of the display to have viewing angles changed. In this manner, some parts of the display may be more private than others.

In some embodiments, a system may automatically adjust the viewing angle of a display, such as based on the content being displayed and the identification of specific users within viewing distance of the display. In some examples, the adjustment of the viewing angles may be conducted by controlling one or more micro-louvers. In some examples, the adjustment of the viewing angle may depend on what is being displayed. For example, the system may detect images and or video being displayed on the monitor that is private in nature. The system may respond by adjusting the viewing angle of the display to an acute angle such that only viewers directly in front of the display may view the content. In some embodiments, the system may selectively adjust the viewing angles of just the pixels being used to display the private content. For example, only a portion of the display may be used to display the private content, and the system may adjust the viewing for that portion of the display but leave the viewing angle for pixels not being used for the private content unadjusted. For example, a user may be browsing a webpage and a pop-up window with adult content may unexpectedly be displayed. The system may recognize that the pop-up window is displaying adult content and automatically adjust the viewing angle for the parts of the display being used to display the pop-up window. In this manner, a user may be saved from embarrassment if they are viewing the content in a public area where the content is visible to other people.

In some embodiments, a system may automatically adjust the viewing angle of a display depending on detected viewers. In some examples, the system may use one or more image sensors to sense viewers viewing the screen, the distance the viewers are from the screen, and the viewing angle in which the viewers are viewing the screen. In some examples, the system may detect viewers using facial recognition. The system may determine which viewers are intended viewers and which are not based on one or more factors, such as the distance of the viewer and/or a determined identity.

For example, the system may determine that viewers that are beyond a certain distance are not intended viewers, and the system may adjust the viewing angle of the display to include the intended viewers while minimizing the number of unintended viewers that can view the content on the display.

In some examples, the system may use facial recognition to identify viewers. The system may use the identity of the viewers and check if the identities are associated with a user, such as a user associated with an account logged into the system and/or associated with the device. Associated with a user may include friends in a social network, family member, and/or the like. The system may check a database of associated identities for a user to determine if the identities of any of the viewers are associated with the user. In some examples, the viewers that are associated with the user may be considered intended viewers, while viewers that are not associated with the user may be categorized as unintended viewers. The system may then adjust the viewing angle to allow intended viewers to view the screen while minimizing the likelihood that unintended viewers are able to view the content on the screen.

For example, the system may use an image sensor to capture an image of objects in front of the display. The system may then implement facial recognition algorithms to identify faces in the captured image. The system may then analyze the identified faces for one or more facial features that may be used to determine an identity associated with the face. For example, the system may determine for each face, the size, shape, and/or color for the nose, eyes, skin, hair, eye brows, cheekbone, wrinkles, and/or the like. The system may also determine distances between facial features and the placement of the features in relation to each other. Based on these determinations, the system may search for stored facial measurements in a database for a match or a match within a threshold value, such as an 80% match. The database may have an identity associated with facial measurements. The system may then use the associated identity to determine whether the faces are intended viewers by determining if there is a connection between the identity and a second identity. The second identity may be an account for the computing device that is controlling the display, or a determined identity for a viewer closest to the center of the display, which may be determined in a similar manner as discussed above.

In some examples, the system may check whether an identity is associated with the second identity based on connections on a social media website, and/or other contacts, such as a contact list, email list, and/or the like. Associated or intended viewers may also be set or identified by the user, such as identifying viewers who can view all content or only specific content. Once the system has determined viewers that are intended viewers, the system may determine the minimum viewing angle for all the intended viewers are capable of viewing the contents of the screen. The system may then instructor cause the monitor to adjust the viewing angle to the minimum viewing angle or at the smallest possible viewing angle if the minimum viewing angle is beyond the capabilities of the display.

In some embodiments, a computer implemented method for securely displaying content includes identifying a first portion of an image separate from a second portion of the image and causing a display to adjust a viewing angle from first pixels associated with the first portion of the image without adjusting the viewing angle from second pixels associated with the second portion of the image.

In some embodiments, a screen privacy system includes a non-transitory memory storing executable instructions and one or more hardware processors coupled to the non-transitory memory configured to read the executable instructions to cause the system to perform receiving a request to adjust a viewing angle of a display device in a first direction and in response to the request, causing the display device to adjust the viewing angle of the display device in the first direction.

In some embodiments, a screen privacy system, includes a non-transitory memory storing executable instructions and one or more hardware processors coupled to the non-transitory memory and configured to read the executable instructions to cause the system to perform capturing an image using an image sensor, conducting facial recognition on the image, and adjusting a viewing angle of a display based on the position of a face recognized in the image.

FIG. 1 illustrates an exemplary embodiment of a computer system 100 adapted for implementing one or more of the embodiments of selective screen privacy discussed herein. As shown, a computer system 100 may comprise or implement software components that operate to perform various methodologies in accordance with the described embodiments. Some computer systems may implement one or more operating systems (OS) such as a MICROSOFT® OS, a UNIX® OS, a LINUX® OS, or other suitable OS. It may be appreciated that the system illustrated in FIG. 1 may be deployed in other ways and that the operations performed and/or the services provided by the system may be combined, distributed, and/or separated over several systems over a network for a given implementation and may be performed by any number of systems. One or more systems may be operated and/or maintained by the same or different entities.

In various implementations, a device that includes computer system 100 may comprise a personal computing device (e.g., a smart or mobile phone, a computing tablet, a personal computer, laptop, wearable device, PDA, Bluetooth device, key FOB, badge, etc.).

Computer system 100 may include a bus 102 or other communication mechanisms for communicating information data, signals, and information between various components of computer system 100. Computer system 100 may include an input/output (I/O) component 104 that processes a user input, such as interactions with a keyboard, keypad, touchpad, touch screen, mouse, etc., and sends a corresponding signal to bus 102. Computer system 100 may include a display 111 and a cursor control 113 as an I/O component. Computer system 100 may include an audio I/O component 105. Audio I/O component 105 may allow a user to use voice for inputting information by converting audio signals into digital signals that may be recorded in a storage component such as memory 114, storage 116, and/or disk drive 117. Audio I/O component 105 may also be configured to output audible sounds in response to received electronic signals. In some embodiments, Audio I/O component 105 may be one or more of a speaker and/or microphone. In some embodiments, computer system 100 may include one or more image capture devices 107, such as a digital camera, video recorder, and other optical sensors for receiving, capturing, and/or recording images.

Computer system 100 may have a transceiver or network interface 106 that transmits and receives signals between computer system 100 and other devices through communication link 118. In various embodiments, Communication link 118 may be wireless, although other transmission mediums and methods may also be suitable. Computer system 100 may include a processor 112, which may be a microcontroller, digital signal processor (DSP), or other processing component for processing information and implementing one or more embodiments described herein.

Components of computer system 100 may also include a system memory component 114 (e.g., RAM), a static storage component 116 (e.g., ROM), and/or a disk drive 117. Computer system 100 may perform specific operations by processor 112 and other components by executing one or more sequences of instructions contained in system memory component 114. Logic may be encoded in a computer readable medium, which may refer to any medium that participates in providing instructions to processor 112 for execution. Such a medium may take many forms, including but not limited to, non-volatile media, volatile media, machine readable media, and/or transmission media. In various implementations, non-volatile media includes optical or magnetic disks, volatile media includes dynamic memory, such as system memory component 114, and transmission media includes coaxial cables, copper wire, and fiber optics, including wires that comprise bus 102. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes or capable of distinguishing ones and zeros, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 100. In various other embodiments of the present disclosure, a plurality of computer systems 100 coupled by communication link 118 to the network (e.g., such as a LAN, WLAN, PTSN, and/or various other wired or wireless networks, including, but not limited to, telecommunications, mobile, and cellular phone networks) may perform instruction sequences to practice the present disclosure in coordination with one another.

A computer system may transmit and receive messages, data, information and instructions, including one or more programs (i.e., application code) through a communication link and a communication interface. Received program code may be executed by a processor as received and/or stored in a disk drive component or some other storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable media. It is also contemplated that software identified herein may be implemented using one or more computers and/or computer systems, networked and/or otherwise. Such software may be stored and/or used at one or more locations along or throughout the system. Where applicable, the ordering of various steps described herein may be changed, omitted, combined into composite steps, and/or separated into sub-steps to provide features described herein.

The foregoing networks, systems, devices, and numerous variations thereof may be used to implement one or more services, such as the services discussed above and in more detail below.

FIG. 2A illustrates a front view of pixel 201A as part of an exemplary system 200A that may be implemented for a plurality of pixels of a display, such as display 111 of FIG. 1, which may be utilized as part of a selective screen privacy system. A display, such as display 111, may be configured to comprise an array of pixel systems similar to system 200A that may, in concert, display images and content as instructed by a computing system, such as computing system 100 of FIG. 1.

In some embodiments, system 200A may include one or more micro-louvers 221A-224A that are adjacent and perpendicular to pixel 201A. Although in this example the pixel is square and the micro-louvers are positioned on each side of the square, other shapes and orientations may be used with more or less micro-louvers and are contemplated herein. For example, one or more of the micro-louvers may be situated to surround one or more corners of pixel 201A. In some examples, a single micro-louver may surround the entirety of pixel 201A. In some examples, system 200 may utilize two micro-louvers instead of four, such as micro-louvers 224A and 223A. In some examples, pixel 201A may be a different shape, such as a circle, triangle, hexagon, and/or the like. In such an example, one or more of the micro-louvers may be shaped and/or positioned to fit and outline the shape of the pixel.

Micro-louvers 221A-224A may be configured such that they may block light from pixel 201A beyond a certain angle. The angle may depend on the distance that micro-louvers 221A-224A extend away from pixel 201A and how far away micro-louvers 221A-224A are positioned from pixel 201A.

In some examples one or more micro-louvers 221A-224A may be a light barrier that blocks, reflects, and/or absorbs light, including light within the visible spectrum. In some embodiments, one or more micro-louvers 212A-224A may be controlled, using electronic inputs, to block light selectively. For example, one or more of micro-louvers 212A-214A may be capable of changing the polarization direction of light and/or selectively block light based on polarization. In such an example, the micro-louver may include a liquid crystal and a linear polarizer. The liquid crystal may have a first state wherein the liquid crystal may cause the polarization of light that passes through the liquid crystal to rotate in a first manner and a second state wherein the liquid crystal does not rotate and/or rotates the polarization of the light in a second manner. As such, if linearly polarized light is received by the micro-louver, the micro-louver may prevent or allow the polarized light to pass through depending on the state of the liquid crystal.

In some examples system 200 may have a first linear polarizer covering pixel 201A such that light emitted from pixel 201A is linearly polarized in a first direction. The micro-louver may have a liquid crystal capable of rotating linearly polarized light by 90 degrees in a first state and not in a second state and a second polarizer that linearly polarizes light in a second direction perpendicular to the direction of the first linear polarizer. In this manner, the micro-louver, when the liquid crystal is in the first state, will allow light emitted through the first linear polarizer from pixel 201A to pass through. Additionally, when liquid crystal is in the second state, the micro-louver will absorb the light emitted through the first linear polarizer from pixel 201A.

In another exemplary embodiment the second linear polarizer may be oriented in the same direction as the first linear polarizer. As such, the light would pass through the micro-louver when the liquid crystal is in the second state and not when in the first state. In some embodiments, a computing device, such as computer system 100, may control which state the liquid crystal is in.

In some embodiments, the liquid crystal may be placed on top of the pixel rather than being part of the micro louver. In such a case, an extra liquid crystal film may be placed on top of a normal display pixel.

In some examples, the liquid crystal used with the micro-louver may be in addition to and different from another liquid crystal that controls whether a pixel is lit. For example, a LCD screen generally implements a liquid crystal sandwiched between two polarizing filters with perpendicular polarization to selectively allow light to be displayed from the pixel. In some examples, an additional liquid crystal film may be placed on top of the LCD pixel and the micro-louver may be another polarizing filter. In this manner, the first liquid crystal that is implemented for the LCD pixel is used to determine whether the pixel is lit, and the second liquid crystal can be used to determine whether light passes through the micro-louver, which in turn affects the viewing angle of the lit pixel. In some examples, the pixel may not implement liquid crystals for controlling whether a pixel is lit. For example, some displays implementing organic light emitting diodes do not implement liquid crystals. In such a case, an implementation of the system 200 may use a polarizing filter and a liquid crystal on top of the polarizing filter and then another polarizing filter that faces perpendicularly to the face of the pixel as a louver. In this manner the liquid crystal may control whether light passes through the louver, which affects the viewing angle of the light from the pixel.

In some embodiments, one or more of micro-louvers 221A-222A may be retractable and/or telescoping. In this manner, the viewing angle of light from pixel 201A may be controlled my adjusting the depth of micro-louvers 221A-222A. Furthermore, each of micro-louvers 221A-222A may be independently retracted, extended, and/or telescoped, and the viewing angle may be different depending on the position and/or state of micro-louvers 221A-222A. For example, if micro-louvers 221A and 223A were to be fully retracted and micro-lever 222A and 224A were to be fully extended, the viewing angle of pixel 201A would be greater when viewed from above or below the pixel, but not from the left or the right. In some embodiments, certain micro-louvers may be configured to be controlled together, such that those micro-louvers maintain the same state. For example, micro-louvers that control the viewing angle up and down for a plurality of pixels may be controlled as a first unit and micro-louvers that control left and right or side to side may be controlled as a second unit. In some examples, all micro-louvers may be controlled as a single unit. In some examples the micro-louvers may be controlled by a computer system, such as computer system 100 of FIG. 1.

In some embodiments, one or more of micro-louvers 221A-222A may be shared with other adjacent pixels. For example micro-louver 221A may be shared as the bottom micro-louver for a pixel directly above pixel 201A, micro-louver 222A may be shared with a pixel directly to the right of pixel 201A, and so forth.

In some embodiments, pixel 201A may be made up of smaller pixels 211, 212, 213. For example each of the smaller pixels 211, 212, and 213 may be configured to display light of a certain color, such as red, green, and blue.

In this manner pixel 201 may produce a broad array of colors through different combinations of light being emitted from smaller pixels 211, 212, and 213.

FIG. 2B illustrates an exemplary a side view of pixel 201B of system 200B. In this example pixel does not have micro-louvers 224A and 222A as shown in FIG. 2A for clarity. In this example of system 200B, micro-louvers 221B and 223B are shown as retractable, with micro-louver 223B partially retracted. As demonstrated by viewing angle 231 in comparison to viewing angle 232, as a micro-louver is retracted the viewing angle for the pixel in the direction of the micro-louver increases. Although not shown in FIG. 2B, system 200B may implement micro-louvers similar to 222A and 224A of FIG. 2A in a similar manner as micro-louvers 221B and 223B on the sides of pixel 201B not covered by micro-louvers 221B and 223B.

Micro-louvers 221B and 223B may be electro-mechanical devices that may be controlled based on electronic input from a computer system, such as computer system 100 of FIG. 1. In some embodiments, micro-louvers 221B and 223B may have two states, such as fully extended and fully retracted. In some embodiments, micro-louvers 221B and 223B may have multiple states, such as fully retracted, fully extended, and partially retracted. In some embodiments, the partially retracted state may be made of several states, such as quarter retraced, half retracted, and three-quarters retracted. In some embodiments, the retracted state of micro-louvers 221B and 223B may be continuous and may be dependent on a particular viewing angle configuration.

In some embodiments, micro-louvers 221B and 223B may be configured to be controlled in unison. In this manner, the viewing angle of pixels adjacent to pixel 201B, which may share micro-louvers 221B and 223B, may maintain the same viewing angles. As such, the display as a whole may control the viewing angle of the content being displayed by the plurality of pixels in one or more directions. In some examples, certain sets of micro-louvers may be configured to be controlled in unison. For example, micro-louvers 221B and 223B may be controlled together with other micro-louvers that control the up and down viewing of pixels in a display, in this manner, the up and down viewing angles may be adjusted independently from the side to side viewing angles. Similarly, micro-louvers 224A and 222A of FIG. 2A, along with other micro-louvers controlling the side to side views of a pixel, may be controlled together to adjust the viewing side to side viewing angles independently from the up and down viewing angles. For example, the top and bottom micro-lovers 221A and 223A of FIG. 2A may be partially retracted in the same manner as micro-louver 223B and the side micro-lovers 224A and 222A may be held in the fully extended position, similar to micro-louver 221B. This would cause the up and down viewing angles to be a first viewing angle 232 while the side to side viewing angle may be a more acute viewing angle 231. In some examples, viewing angle 232 may be 50-80 degrees, and viewing angle 231 may be 20-40 degrees.

FIG. 2C illustrates a side view of pixel 201C of exemplary system 200C wherein the micro-louvers can change in size. In some embodiments, system 200C may be system 200A of FIG. 2A without micro-louvers 224A and 222A for clarity. As shown, micro-louver 221C is in a retracted position which is smaller than micro-louver 223C, which is in an extended position. As such, the viewing angle of pixel 201C is affected by the size of micro-louvers 221C and 223C. Although not shown in FIG. 2A, micro-louvers 222A and 224A may also be implemented in a similar manner as micro-louvers 221C and 223C on the sides of pixel 201A. In some embodiments, the micro-louvers may be configured to extend and retract in a telescoping manner.

Similar to the micro-louvers in FIG. 2B, these micro-louvers may be electro-mechanical devices that may be controlled by a computer system, such as computer system 100 of FIG. 1. In some embodiments, the retracted state of micro-louvers 221C and 223C may be dependent on a particular viewing angle setting. For example, the micro-louvers may be in a fully retracted state for maximum viewing angle or fully extended for minimal or an acute viewing angle. In some embodiments, micro-louvers 221C and 223C may be configured to be controlled in unison. In this manner, the viewing angle of pixels adjacent to pixel 201C, which may share micro-louvers 221C and 223C, may maintain the same viewing angles. As such, the display as a whole may control the viewing angle of the content being displayed by the plurality of pixels in one or more directions.

In some embodiments, system 200C may be implemented in a similar manner described above in relation to system 200A and 200B. For example, micro-louver 221C and 223C may be controlled together with other top and bottom micro-louvers for pixels in a display to set the up and down viewing angle of the display to a first angle, while another set of micro-louvers may be controlled to change the side to side viewing angles of the display to a second angle.

Also, as shown in FIG. 2C, system 200C may be configured such that there is a distance 241 separating pixel 201C and the micro-louvers. In this manner, the viewing angle can be further decreased. In some embodiments, the display may be controlled by a computer system, such computer system 100 of FIG. 1, to change distance 241 by moving either the pixels of the display or the micro-louvers. As shown, the micro-louvers may be held together by a transparent film and/or structure 251. Although light from pixel 201 may be viewed when passed underneath the micro-louvers with separating distance 241, the micro-louvers of the other pixels may minimize the viewing angle of the light passing under the micro-louvers. As such, at most a few rows of pixels may be viewable from light leaking from underneath the micro-louvers, but the majority of pixels would not be visible beyond the viewing angle caused by the micro-louvers. This would effectively obscure whatever content is being displayed when the display is viewed beyond the viewing angle caused by the micro-louvers. In some embodiments, transparent film 251 may be a liquid crystal film that may be controlled to change from at least two different states. For example, the liquid crystal may be configured to rotate the polarization of light when passing through the transparent film 251 in a first state and not in a second state. In some examples, film 251 may include a polarizing filter that blocks certain polarization directions of light.

Although different features are discussed between FIGS. 2A-2C, each of the features may be omitted and/or implemented in combination with the different features of each figure. Additionally, the liquid crystal, telescoping, extension, separation distance, and retraction capabilities discussed above may be controlled by the display in response to commands from a computer system, such as computer system 100 that is coupled to the display. In some embodiments, computer system 100 may implement the methods described herein for controlling the micro-louvers for dynamically adjusting the viewing angle of content being displayed on the display.

Figure 3:
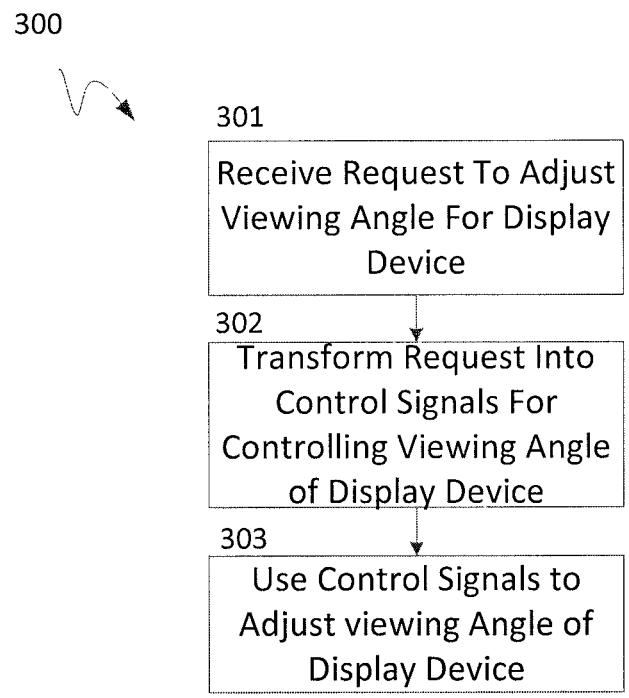
FIG. 3 illustrates a flow diagram of an exemplary process for adjusting the viewing angle of a display.

FIG. 3 is a flow diagram illustrating an exemplary process 300 that may be implemented to adjust the viewing angle of a display. In some examples, a system, such as system 100 of FIG. 1 with a display implementing one or more systems described in FIGS. 2A-2C, may implement process 300.

At process 301, the system may receive a request to adjust the viewing angle for a display device. In some examples, the system may provide viewing angle options that a user may select from. The system may receive the user selection as a request to adjust the viewing angle. In some examples, the viewing angle options may be displayed as part of a graphical user interface (GUI) that a user may interact with through an input device, such as a touch screen and/or cursor control device. In some examples, the viewing angle options may be preset choices that are selectable by a user. In some examples, the viewing angle options may be manually entered in by a user.

At process 302, the system may transform the request into commands that cause the display to adjust the viewing angle according to the request received at process 301. For example, a request to reduce the side to side viewing angle of a display may be transformed into one or more matrix and/or array of values that, when sent to the display device, causes the display to adjust the side to side viewing angles of one or more pixels. In some examples, the request may indicate a viewing angle setting, such as 30 degrees side to side. In response, the system may determine a particular length and/or retraction state for one or more micro-louvers to achieve the viewing angle setting. The length and/or retraction state of the micro-louver may be calculated based on the size of the pixel and the requested angle using angle properties of a triangle and Pythagorean's theorem. The length may be used as commands for adjusting one or more micro-louvers.

At process 303, the transformed command at process 302 may be communicated to a display device causing the display device to adjust viewing angles according to the request at process 301. In some examples, the command may cause the display to retract or extend one or more micro-louvers. In some examples, the command may cause a liquid crystal to change states such that light emitted from a pixel is blocked by or passes through a micro-louver. In some examples, the commands may adjust the distance between one or more pixels and one or more micro-louvers. In some examples, the command may cause the display to change one or more viewing angles in other manners depending on the technology of the display.

Figure 4:
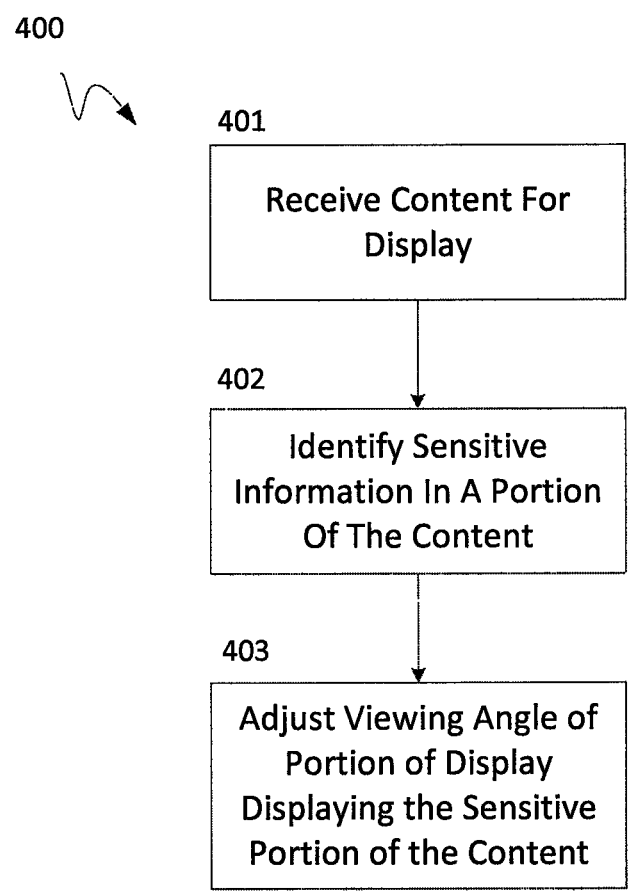
FIG. 4 illustrates a flow diagram illustrating an exemplary process for adjusting viewing angles of a display automatically based on content.

FIG. 4 is a flow diagram illustrating an exemplary process 400 that may be implemented to adjust the viewing angle of a display automatically based on the type of content being displayed. In some examples, a system, such as system 100 of FIG. 1 with a display implementing one or more systems described in FIGS. 2A-2C, may implement process 400.

At process 401, the system may receive content for display. The content may be an image or video stored in a computer readable medium and/or received over a network. The content may be translatable to instructions for causing a display device to display the image through a plurality of pixels. For example, the image and/or video may be represented as one or more matrices and/or arrays of values and/or a series of matrices and/or arrays of values that correspond to one or more commands for one or more pixels of a display device. In some examples, an image may have a matrix of values corresponding to color, brightness, and/or position.

At process 402, the system may identify a portion of the content, image, and/or video that is associated with sensitive information, such as a password, adult content, user name, address, financial information, and/or the like. In some examples, the content may self-identify the portions of the content, image, and/or video that is associated with sensitive information. For example, the image may include one or more matrices and/or arrays of values and/or a series of matrices and/or arrays of values indicating pixels of an image that are associated with sensitive information.

In some embodiments, the system may analyze the content, image, and/or video for sensitive information. In some examples, the system may detect a portion of the content that is associated with a data entry field. In some examples, the system may conduct optical character recognition (OCR) on images intended for display and identify portions of the image that include text associated with addresses, names, financial information, user names, and/or the like. In some examples, the system may analyze images using image recognition for portions of the image that may be associated with adult content, such as images of genitalia or blood. In some embodiments, the system may conduct OCR and check for certain keywords and/or images that indicate that the image or video should be shown in a more private manner. For example, the system may search for curse words, vulgar words, bank names, names of e-commerce websites, names of payment institutions, names of email providers, characters formatted in the form of an address and/or the like to determine that the image being displayed is private and/or adult in nature. In some examples, the system may categorize content for certain age groups, privacy levels, and/or the like.

At process 403, the system may cause the display device to adjust the viewing angle of one or more pixels of the display that corresponds to the display of sensitive information.

For example, the system may cause the display to retract or extend one or more micro-louvers of a display, such as display 111 of FIG. 1 and/or a display implementing one or more of the systems in FIGS. 2A-2C. In some examples, the command may cause a liquid crystal to change states such that light emitted from a pixel is blocked by a micro-louver. In some examples, the system may cause the display to adjust the distance between one or more pixels and one or more micro-louvers. In some examples, the command may cause the display to change the viewing angles of one or more pixels in other manners depending on the technology of the display.

In some examples, the system may cause the viewing angle of the entire display to change in response to determining that one or more images or videos being displayed is intended to be private. In some examples, the system may selectively adjust the viewing angle of the portions of the display displaying the images and/or videos that has been determined as private. As such, such a system would save a user from embarrassment if the user unintentionally causes the display of private, adult, and/or embarrassing content, such as an unintended pop-up ad.

Figure 5:
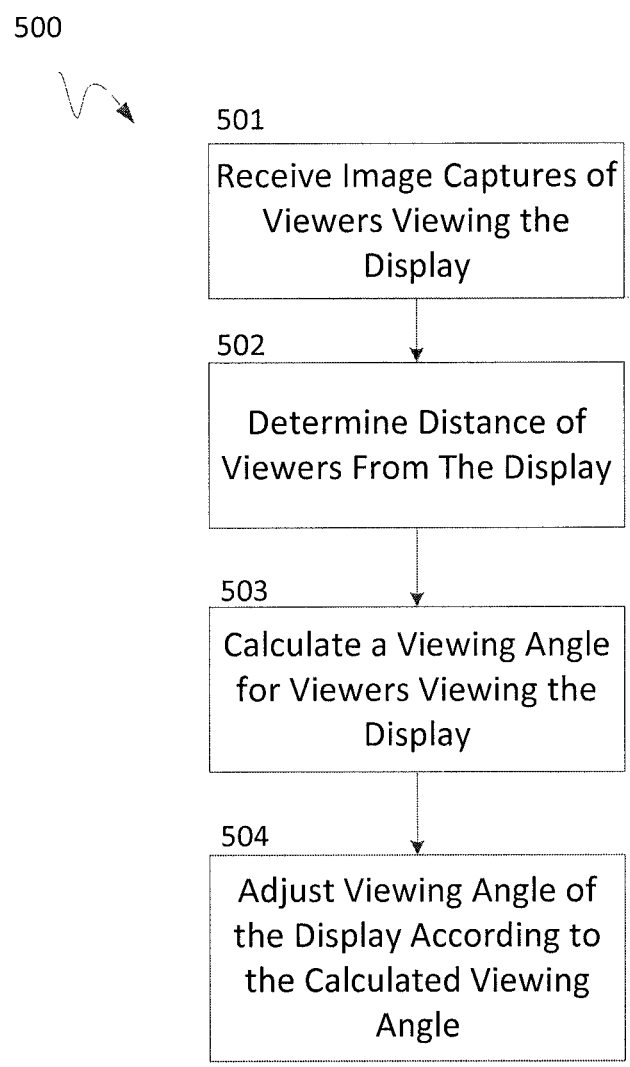
FIG. 5 illustrates a flow diagram illustrating an exemplary process for adjusting viewing angles of a display automatically based on detected viewers.

FIG. 5 is a flow diagram illustrating an exemplary process 500 that may be implemented to adjust the viewing angle of a display automatically based on detected viewers. In some examples, a system, such as system 100 of FIG. 1 with a display implementing one or more systems described in FIGS. 2A-2C, may implement process 500.

At process 501, the system may receive one or more image captures of viewers viewing a display device. In some examples, the system may receive the one or more image captures by causing one or more image capture devices, such as a webcam, to capture the images. In some example, one or more of the image capture devices may be image capture device 107 of FIG. 1. In some embodiments, the image capture device may be positioned and/or configured to capture images of objects directly in front of the display device.

At process 502, the system may analyze the received images to determine the distance of one or more viewers in front of the display. For example, the system may conduct image processing on the image to detect faces and then calculate the distance of the faces in relation to the display. In some embodiments, the system may determine the distance of one or more detected faces using principals of stereoscopic imaging. The distance between the camera and the face can be determined using images taken simultaneously from two or more cameras in the same plane when the viewing angle of each camera is known. The distance a viewer from a display can then be extrapolated from the distance of the imagining devices from the display. In some embodiments, other methods of determining the distance of each face from the display may be used, such as the implementation of one or more laser measures.

In some embodiments, the system may use the calculated distance to determine which faces are intended or approved viewers and which faces are unintended viewers. For example, the system may determine that faces that have calculated distances beyond a threshold distance are unintended viewers. In some embodiments, the threshold distance may be predetermined In some embodiments, the threshold distance may be calculated based on a plurality of distances calculated for each face detected. For example, the system may take the plurality of determined distances and calculate a mean, mode, and/or standard deviation of the plurality of distances. The system may determine that viewers beyond the calculated mean or mode and a multiplier of the calculated standard deviation are unintended viewers. In some embodiments, the threshold distance may be calculated based on a Gaussian distribution.

In some embodiments, the intended and unintended viewers may be categorized based on whether a viewer is associated with a user of the system, a user for a particular account, and/or an owner of one or more of the devices implementing one or more processes of process 500. The determination of whether a view is intended or unintended can also be based on the type of content for a particular viewer. For example, one type of content may be suitable or intended for a first type of viewer, but not for a second type of viewer, even though both types of viewers are associated with the user. For example, one may want friends to be able to view certain content, but not a family member, such as a younger sibling or parent. In some examples, the user may be able to categorize intended and/or unintended based on age and/or other attributes. In some embodiments, the age of the viewer may be determined based on analysis of the facial image, the identity and an associated birthdate with the identity, and/or other methods of determining an age of a viewer.

In some embodiments, the system may detect unique features of the faces in the image captured and use the unique features to identify the viewers. In some embodiments, the system may use images from a social media account associated with a user to determine whether any of the viewers are associated with the user. The system may identify facial features in images associated with accounts that are connected with the user. For example, the system may access a database of identities with associated facial features and request and/or check whether facial features of a face in the captured image matches any of the facial features in the database. The system may determine and/or identify the viewers by comparing facial features captured by the imaging device with facial features of faces in images the database. The identities may then be cross checked with identities that are associated with the user. Faces that are identified as individuals who are connected to the user in some manner, such as through a social media connection, may be considered as intended viewers. Any faces that are unidentifiable and/or are identified but not connected with the user may be categorized as an unintended viewer.

At process 503, the system may determine the viewing angle for the viewers based on the distances calculated at process 502. In some embodiments, the system may determine the viewing angle of a detected face based on the location of the face in the image in relation to the center of the image and the distance between the camera and the face calculated at process 502. The viewing angle calculated would be in relation to the image capture device, which can translated to the viewing angle in relation to a display based on the relationship of the display and the image capture devices. The viewing angle from the detected face may be calculated based on different parts of the face, such as the center of the detected face, between the eyes of the face, from the farthest eye, and/or the like.

In some embodiments, multiple viewing angles for each viewer may be calculated. For example, a first viewing angle of a viewer may be the up and down viewing angle of the display and a second viewing angle may be the side to side viewing angle of the display.

In some embodiments, the system may determine the minimum viewing angle necessary for the viewers based on the detected face that is viewing the display at the largest and/or most obtuse angle. In some embodiments, process 503 may be implemented for intended viewers and ignored for unintended viewers determined at process 502. This angle may change as intended and unintended viewers come within the viewing angle of the content in the display.

At process 504, the minimum viewing angle determined at process 503 may be used to adjust the viewing angle of the display. For example, the system may cause the display to retract or extend one or more micro-louvers. In some examples, the command may cause a liquid crystal to change states such that light emitted from a pixel is blocked by or passes through a micro-louver. In some examples, the system may cause the display to adjust the distance between one or more pixels and one or more micro-louvers. In some examples, the command may cause the display to change the viewing angles of one or more pixels in other manners depending on the technology of the display.

Once unintended users are no longer detected, the viewing angle restrictions may be removed or returned to an earlier setting. Similarly, when new unintended users are detected, the system may cause certain portions of the display to be not viewable by the new unintended users, such as described herein. Thus, the system can dynamically change viewable content as viewers arrive and depart from the display and as content changes on the display.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A computer implemented method for securely displaying content, the method comprising:
    identifying a first portion of an image separate and different from a second portion of the image;
    determining a location of first pixels associated with the first portion of the image on a display; and
    in response to determining the location of the first pixels, causing the display to adjust a viewing angle from the first pixels associated with the first portion of the image without adjusting the viewing angle from second pixels associated with the second portion of the image, the viewing angle being adjusted by retracting or extending one or more louvers associated with the first pixels.

2. The method of claim 1, wherein identifying the first portion of the image comprises determining that the first portion of the image delineates a data entry field.

3. The method of claim 1, wherein identifying the first portion of the image comprises determining a type of content in the first portion of the image.

4. The method of claim 1, wherein causing the display to adjust the viewing angle comprises:
    determining a first viewer associated with a device coupled with the display;
    detecting a second viewer; and
    determining that the second viewer is an unintended viewer of the content.

5. The method of claim 4, further comprising causing the display to return the viewing angle from the first pixels associated with the first portion of the image to a previous viewing angle when the unintended viewer has been detected as leaving a viewing area of the display.

6. The method of claim 4, wherein the viewing angle renders the content unviewable by the second viewer.

7. The method of claim 4, wherein determining the second viewer is an unintended viewer of the content is based at least on the content, location of the display, and information about the second viewer.

8. The method of claim 4, wherein determining the second viewer is an unintended viewer comprises identifying the second user and determining a relationship between the second viewer and the first viewer.

9. A screen privacy system, comprising:
    a non-transitory memory storing executable instructions; and one or more hardware processors coupled to the non-transitory memory and configured to read the executable instructions to cause the system to perform operations comprising:
        receiving a request to adjust a viewing angle of a display device in a first direction; and
        in response to the request, causing the display device to adjust the viewing angle of the display device in the first direction by retracting or extending one or more louvers.

10. The system of claim 9, wherein the operations further comprise receiving a request to adjust the viewing angle of the display device in a second direction and causing the display device to adjust the viewing angle of the display device in the second direction in response.

11. A screen privacy system comprising:
    a non-transitory memory storing executable instructions; and one or more hardware processors coupled to the non-transitory memory and configured to read the executable instructions to cause the system to perform operations comprising:
        capturing an image of a user using an image sensor;
        conducting facial recognition on the image; and
        adjusting a viewing angle of a display based on the position of a face recognized in the image by retracting or extending one or more louvers.

12. The system of claim 11, wherein the operations further comprise determining an angle of the face in relation to the image sensor based at least in part on the location of the face in the image.

13. The system of claim 11, wherein the viewing angle is adjusted based on the determined angle.

14. The system of claim 13, wherein the adjusted viewing angle is greater than or equal to the determined angle.

15. The system of claim 11, wherein the operations further comprise determining whether the face recognized in the image matches an identity associated with a user.

16. The system of claim 15, wherein the adjusted viewing angle is more acute when the face recognized in the image does not match an identity associated with the user.

17. The system of claim 15, wherein the adjusted viewing angle is more obtuse when the face recognized in the image does match an identity associated with the user.

18. The system of claim 11, wherein adjusting the viewing angle comprises adjusting one or more micro-louvers.

19. The system of claim 18, wherein adjusting one or more micro-louvers comprises extending or retracting the one or more micro-louvers.

* * * * *